(12) United States Patent
Sun

(10) Patent No.: US 8,478,054 B2
(45) Date of Patent: Jul. 2, 2013

(54) METHOD AND SYSTEM FOR TEXT CLASSIFICATION

(75) Inventor: Xiang Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/996,579

(22) PCT Filed: Nov. 2, 2010

(86) PCT No.: PCT/US2010/055057
§ 371 (c)(1),
(2), (4) Date: Dec. 6, 2010

(87) PCT Pub. No.: WO2011/096969
PCT Pub. Date: Aug. 11, 2011

(65) Prior Publication Data
US 2012/0288207 A1    Nov. 15, 2012

(30) Foreign Application Priority Data

Feb. 2, 2010   (CN) .......................... 2010 1 0111365

(51) Int. Cl.
*G06K 9/00* (2006.01)
*G06K 9/48* (2006.01)
(52) U.S. Cl.
USPC .......................... 382/224; 382/168; 382/197
(58) Field of Classification Search
USPC ................. 382/224, 100, 106, 107, 128, 155, 382/168, 173, 181, 170, 176, 190, 195, 197, 382/254; 706/45, 12; 707/5
See application file for complete search history.

(56) References Cited

U.S. PATENT DOCUMENTS

| | | | |
|---|---|---|---|
| 5,371,807 A | 12/1994 | Register et al. | |
| 6,137,911 A | 10/2000 | Zhilyaev | |
| 6,185,550 B1 | 2/2001 | Snow et al. | |
| 6,253,169 B1 | 6/2001 | Apte et al. | |
| 6,611,825 B1 * | 8/2003 | Billheimer et al. | 706/45 |
| 6,868,411 B2 | 3/2005 | Shanahan | |
| 7,519,619 B2 | 4/2009 | Huang | |
| 7,529,719 B2 | 5/2009 | Liu et al. | |
| 7,752,159 B2 | 7/2010 | Nelken et al. | |
| 2004/0220944 A1 | 11/2004 | Behrens et al. | |
| 2006/0089947 A1 | 4/2006 | Gallivan et al. | |
| 2006/0142993 A1 | 6/2006 | Menendez-Pidal et al. | |
| 2007/0118506 A1 | 5/2007 | Kao et al. | |
| 2007/0198508 A1 * | 8/2007 | Yoshimura | 707/5 |
| 2007/0214135 A1 | 9/2007 | Crivat et al. | |
| 2008/0097937 A1 * | 4/2008 | Hadjarian | 706/12 |
| 2008/0215313 A1 | 9/2008 | Waelti et al. | |
| 2009/0094177 A1 | 4/2009 | Aoki | |

OTHER PUBLICATIONS

The PCT Search Report mailed May 24, 2011 for PCT Application No. PCT/US10/55057.

* cited by examiner

*Primary Examiner* — Sheela Chawan
(74) *Attorney, Agent, or Firm* — Lee & Hayes, PLLC

(57) ABSTRACT

The present disclosure discloses simplified text classification with improved classification accuracy. The content of receive text is segmented to obtain multiple words. A sum of word vectors of the multiple words at a first level vector space of a vector space group is determined. A vector space in the vector space group is composed of one or more direct child classes that are non-leaf child classes in a tree class structure. The text is classified into a class among various class of the first level vector space that has a shortest distance to the sum of the word vectors.

18 Claims, 7 Drawing Sheets

METHOD AND SYSTEM FOR TEXT CLASSIFICATION

CROSS REFERENCE TO RELATED PATENT APPLICATIONS

This application is a national stage application of an international patent application PCT/US10/55057, filed Nov. 2, 2010, which claims priority from Chinese Patent Application No. 201010111365.3 filed on Feb. 2, 2010, entitled "METHOD AND SYSTEM FOR TEXT CLASSIFICATION," which applications are hereby incorporated in their entirety by reference.

TECHNICAL FIELD

The present disclosure relates to the computer and communication field, and particularly relates to methods and systems for text classification.

BACKGROUND

Text classification is an important aspect of text mining. Text mining refers to the classification of each text in a text set according to predefined subject classification classes. Classification of texts using automatic text classification system can help users better locate requested information and knowledge. From a user perspective, classification is basically the recognition of textual information. Traditional text classification techniques have provided fair classification results. However, with an increase in the availability of textual information, especially a boom of online textual information on the Internet, automatic text classification has become a key technology for the processing and organization of large volumes of textual data. Currently, text classification is widely used in a variety of fields. With the increase in the volume of textual information, the users are demanding higher accuracy and completeness in text classification. Therefore, the need for improved text classification techniques is also increasing. However, the formulation of effective text classification techniques remains an active area of study in text mining.

SUMMARY OF THE DISCLOSURE

The present disclosure provides methods and systems for text classification of text. The methods and systems can also increase the accuracy and simplify processes of text classification.

In one aspect, a method for text classification includes segmenting content of received text into multiple words. A sum of the plurality of word vectors of the multiple words at a first level vector space is determined. The first level vector space is part of a vector space group that includes a plurality of vectors. At least one of the plurality of the vector spaces in the vector space group includes one or more direct child classes that are leaf child classes in a tree structure. The text is classified into a class of the plurality of classes that has a shortest distance to the sum of the word vectors.

In another aspect, an apparatus for text classification includes a segmentation module to segment content of received text into multiple words. The apparatus further includes a calculation module to determine a sum of the plurality of word vectors of the multiple words at a first level vector space is determined. The first level vector space is part of a vector space group that includes a plurality of vectors. At least one of the plurality of the vector spaces in the vector space group includes one or more direct child classes that are leaf child classes in a tree structure. The apparatus also includes a calculation module to classify the text into a class of the plurality of classes that has a shortest distance to the sum of the word vectors.

In yet another aspect, text content in a received text is segmented to obtain multiple words. Subsequently, a sum of word vectors of the multiple words in a first level vector space of a vector space group is obtained. The text is then classified into a class of the classes in the first level vector space that has a shortest distance to the sum of the word vectors of the text. Thus, such embodiments implement a top-down classification method that initiates from the first level vector space. Further, the total calculation volume is equal to a sum of all the dimensions of the vector spaces at a route from top to bottom.

In contrast, existing text classification techniques only use a vector space that includes leaf child classes for classifying text. In other words, the existing text classification techniques do not use the parent classes for text classification. Instead, the existing text classification techniques is only capable of using a vector space that is associated with the leaf child classes for text classification.

Thus, an existing text classification technique may initially involve pre-establishing multiple classification classes and determining a word frequency value for each of a set of words in each class using statistics and learning algorithms. Subsequently, the content of a received text is segmented to obtain multiple words. Further, the existing classification technique may calculate for each classification class, a sum of the word frequency values of the one or more words of the multiple words in each class. Accordingly, a classification class with a highest sum is the classification class for the text.

When there is only one class or the parent class only has one child class, the total calculation volume for the embodiments described herein (i.e., the sum of the dimensions of the vector space in the route from top to bottom) may be larger than the total calculation volume for text classification using existing techniques (i.e., the dimensions of all leaf classes). However, in text classification, it is unlikely that there is only one class or that a parent class only has one child class, as actual applications of text classification generally do not use such classification schemes. Thus, the calculation volumes used in the embodiments described herein is less than the calculation volumes of used in existing text classification techniques. In addition, the dimensions of each vector space in the embodiments described herein are far less than those used by the existing text classification techniques. Accordingly, with the use of the embodiments described herein, errors in text classification may be reduced, and the accuracy of text classification may be improved.

DETAILED DESCRIPTION

The embodiments described herein pertain to systems and methods for text classification. In such embodiments, each of the vector spaces used for text classification may include a tree class structure that has direct child classes that are non-leaf child classes. The first level vector space is composed of top level classes in the tree class structure. Further, a predetermined number of vector spaces may constitute a vector space group. The number of dimensions in each vector space is equal to the number of classes in each vector space.

In some embodiments, textual content in a received text is segmented to obtain multiple words. Subsequently, a sum of word vectors of the multiple words in a first level vector space of a vector space group is obtained. The text is then classified into a class of the classes in the first level vector space that has a shortest distance to the sum of the word vectors of the text. Thus, such embodiments implement a top-down classification method that initiates from the first level vector space. Further, the total calculation volume is equal to a sum of all the dimensions of the vector spaces at a route from top to bottom.

In contrast, existing text classification techniques only use a vector space that includes leaf child classes for classifying text. In other words, the existing text classification techniques do not use the parent classes for text classification. Instead, the existing text classification techniques are only capable of using a vector space that is associated with the leaf child classes for text classification.

Thus, an existing text classification technique may initially involve pre-establishing multiple classification classes and determining a word frequency value for each of a set of words in each class using statistics and learning algorithms. Subsequently, the content of a received text is segmented to obtain multiple words. Further, the existing classification technique may calculate for each classification class, a sum of the word frequency values of the one or more words of the multiple words in each class. Accordingly, a classification class with a highest sum is the classification class for the text.

Figure 1:
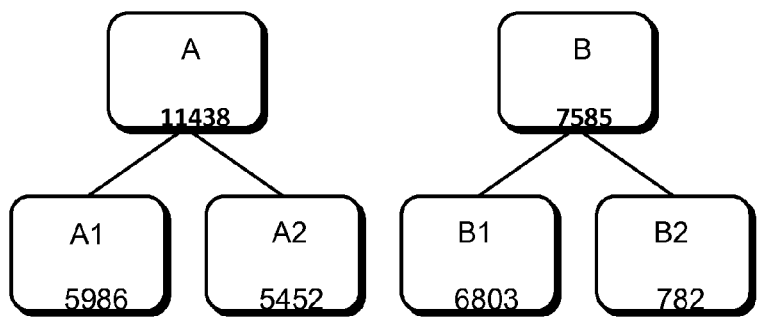
FIG. 1 illustrates a diagram of text classification using current technologies.

However, a situation shown in FIG. 1 may occur. As shown in FIG. 1, squares A and B represent two classes. Squares A1 and A2 represent two child classes under the class A, and squares B1 and B2 represent two child classes under the class B. Further, the number in each square represents a word frequency value of a particular word in each corresponding class. Using existing text classification techniques, text including the particular word is likely to be classified into the child classification class B1. However, although the particular word has a highest word frequency value in B1 with respect to the child classes, a word frequency value of the particular word in the class A is much higher than that in the class B. Thus it is more appropriate to classify the text that includes the particular word into the class A or the class A1.

Therefore, text classification using existing text classification techniques is not sufficiently accurate. In addition, when there are many classes, the calculation volume to calculate the sum of word frequency values of the multiple words in each class is huge, and may greatly increase text classification errors.

When there is only one class or the parent class only has one child class, the total calculation volume for the embodiments described herein (i.e., the sum of the dimensions of the vector space in the route from top to bottom) may be larger than the total calculation volume for text classification using existing techniques (i.e., the dimensions of all leaf classes). However, in text classification, it is unlikely that there is only one class or that a parent class only has one child class, as actual applications of text classification generally do not use such classification schemes. Thus, the calculation volumes used in the embodiments described herein is less than the calculation volumes used in existing text classification techniques. In addition, the dimensions of each vector space in the embodiments described herein are far less than those used by the existing text classification techniques. Thus, with the use of the embodiments described herein, errors in text classification may be reduced, and the accuracy of text classification may be improved.

Figure 2:
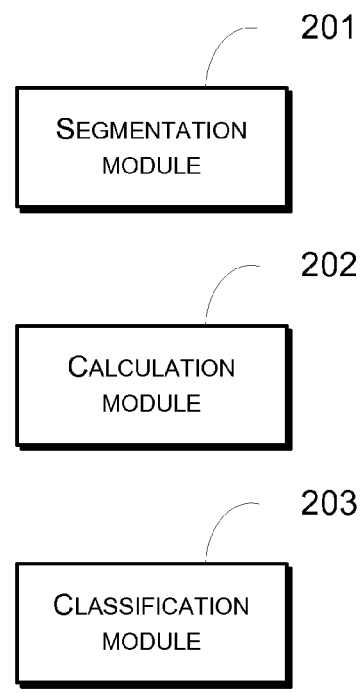
FIG. 2 illustrates a diagram of an exemplary apparatus for text classification in accordance with various embodiments.

FIG. 2 illustrates a main diagram of an exemplary apparatus for text classification in accordance with various embodiments. As shown in FIG. 2, an apparatus for text classification at least includes a segmentation module 201, a calculation module 202, and a classification module 203.

The segmentation module 201 is to segment content of a received text into multiple words.

The calculation module 202 is to determine a sum of word vectors of the multiple words at a first level vector space of a vector space group. The first level vector space is composed of a top-level class of the tree class structure. The vector space group is composed of all vector spaces, and may include at least one vector space that is composed of one or more direct child classes that are non-leaf child classes in a tree class structure.

Each word vector includes the word frequency vectors of a corresponding word at every class of the vector space. Each word frequency vector is a word frequency statistics value of a corresponding word in a class, which may be obtained after quantization of the word frequency statistics value of the corresponding word in the class. During the quantization of the word frequency statistics value of a word in each of various classes, the quantization may use one preset default quantization function or a plurality of different preset quantization functions.

The classification module 203 is to classify the text into a class of the various classes in the first level vector space, the class having a shortest distance to the sum of the word vectors of the text.

To simplify the classification process, the calculation module 202 may determine the sums of the word vector components for each of the multiple words at the first level vector spaces (i.e., the sums of word frequency vectors in various classes for each word). The classification module 203 is to classify the text into a class corresponding to a highest sum of the word vector components. For example, word vectors of a word in a vector space may be represented as $W_{mn} = \{V_{mn1}, V_{mn2}, \ldots, V_{mnN}\}$, in which $V_i$ may represent a word frequency vector at a class $C_i$ of the vector space, $i = 1 \ldots N$, N may represent a total number of classes in the vector space, m may represent a m-th word, and n may represent a n-th vector space. Accordingly, a distance between a text D and the class $C_i$ may be a distance between $\Sigma W_{mn}$ and the class $C_i$ that may be represented by Distance=$\Sigma W_{mn} - C_i = \{\Sigma V_{n1}, \Sigma V_{n2}, \ldots, \Sigma V_{nN}\} - C_i$.

Figure 3:
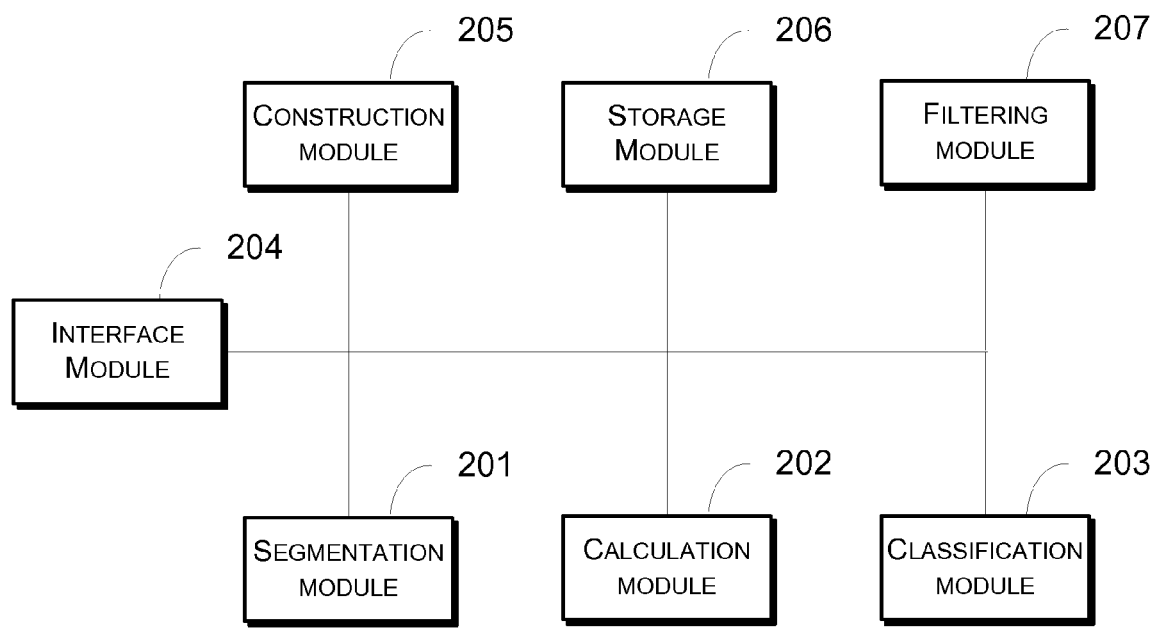
FIG. 3 illustrates a detailed diagram of an exemplary apparatus for text classification in accordance with various embodiments.

In some embodiments, the apparatus may also include, by reference to the FIG. 3, an interface module 204, a construction module 205, a storage module 206, and a filtering module 207.

The interface module 204 is to obtain a text. The interface module 204 may use wire or wireless methods to obtain the text to be classified outside the apparatus.

The construction module 205 is to construct a vector space group. In various embodiments, the tree class structure may be established in advance. The construction module 205 constructs a vector space for each non-leaf sub class in the class tree structure. The dimension of each vector space is the number of direct child classes (excluding recursive child classes) in the respective vector space. Elements in each vector space may include word frequency vectors of each word in the direct child classes (specifically the word frequency statistics value or quantization of the word frequency value which can be obtained by statistics). A word frequency vector of a word in the parent class can be independently calculated by statistics or by obtaining a sum of the word frequency vectors of the word in s the direct child classes of the parent class. The construction module 205 combines all vector spaces into the vector space group. The number of spaces in the vector space group is equal to the number of all non-leaf child classes. The dimension of the vector space group is equal to a sum of dimensions of all vector spaces. Specifically, for example, there may be N non-leaf child classes $C1, C2, \ldots, CN$. Each non-leaf child class $Ci$ may include a number of $Mi$ direct child classes $Ci1, Ci2, \ldots, CiMi$. For each non-leaf child class $Ci$, its vector space may be represented as $Si=\{Ci1, Ci2, \ldots, CiMi\}$, in which its dimension=M. The vector space group may be represented as $G=\{S1, S2, \ldots SN\}$, in which its dimension=N, and $N=\Sigma Mi$, which in fact is equal to the number of all classes M−1 (as there is often no root class).

The storage module 206 is to store the vector space group, and to store the text by class.

Figure 4:
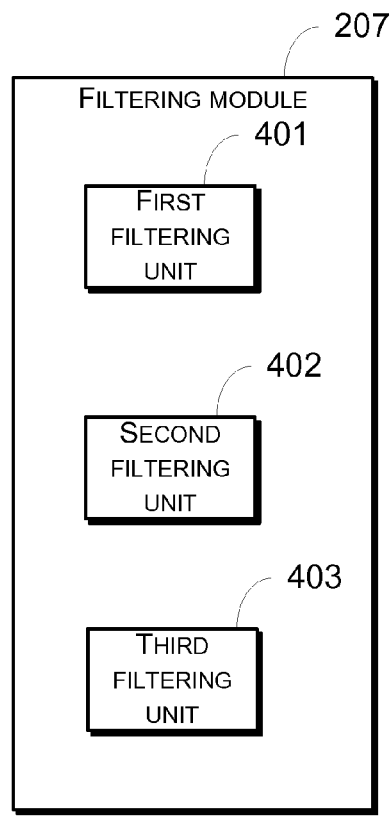
FIG. 4 illustrates a diagram of an exemplary calculation module in accordance with various embodiments.

The filtering module 207 is to filter the obtained multiple words to obtain multiple filtered words. By reference to the FIG. 4, the filtering module 207 includes a first filtering unit 401, a second filtering unit 402, and a third filtering unit 403.

The first filtering unit 401 targets each word that is in the classes of the first level vector space to determine whether an average value of the word frequency vectors of the word in the classes is higher than a pre-defined first filtering threshold value. Thus, in such embodiments, the calculation module 202 may be alternatively configured to determine a sum of the word vectors of the words with such average values that are higher than the first filtering threshold value at the first level vector space. For example, the first filtering threshold value may be 1/100,000 of the number of a total word corpus.

The second filtering unit 402 targets each word that is in the classes of the first level vector space to determine whether a highest value word frequency vector of the word has a value that is higher than a pre-defined second filtering threshold value. Thus, in such embodiments, the calculation module 202 may be alternatively configured to determine a sum of the word vectors of the words with such highest word frequency vector values that are higher than the second filtering threshold value at the first level vector space. For example, the second filtering threshold value may be 1/100,000 of the number of a total word corpus.

The third filtering unit 403 targets each word to obtain a variance factor of the word at the first level vector space, and to determine whether each variance factor is higher than a pre-defined variance factor threshold (such as 0.5). Thus, in such embodiments, the calculation module 202 may be alternatively configured to determine a sum of the word vectors of the words whose variance factors are higher than the variance factor threshold value at the first level vector space. Through the variance factors, words with few changes in word frequencies among various classes can be filtered out (for example, the word frequency of "you" or "me" are basically the same in various classes), and words with significant changes in word frequencies among various classes are retained (such as terminologies whose word frequency values in the terminology-related special classes are apparently higher than those in the other classes). The words with significant changes in word frequencies among various classes may show up in one or more classes. Such words may contribute more to the accuracy of text classification than other words. In this way, the embodiments described herein may regard such words as good words and select for such words via filtering.

The first filtering unit 401 and the second filtering unit 402 can be used concurrently. For example, the first filtering unit 401 may target each word to determine whether an average value of the word frequency vectors of the word in the classes of the first level vector space is higher than the pre-defined first filtering threshold value. The second filtering unit 402 may targets the words filtered by the first threshold value to determine whether a highest value word frequency vector of the word in the classes of the first level vector space is higher than the pre-defined second filtering threshold value. However, additional filtering methods may be implemented in other embodiments, which are not detailed herein.

The classification module 203 also includes a space sub-module. Following the classification of the text into a class having a shortest distance to the word vectors of the text, as selected from various classes of the first level vector space, the space sub-module may be used to determine whether the class is equivalent to a vector space. If affirmative, an inquiry unit 401 is instructed to determine the word vectors of the multiple words in the vector space. The filtering module 207 is used to filter the words and the calculation module 202 is used to determine a sum of the word vectors. The classification unit in the classification module 203 then re-classifies the text into a class of the classes in the vector space that has a shortest distance to the word vectors until the class that the text is classified into is no longer equivalent to a vector space.

The calculation module 202 is also used to delete one or more words of the multiple words that are used to determine the word vectors after the associated text is classified into the corresponding class using a highest sum of the word vectors. In other words, the filtering module 207, after sending the one or more words that are selected by filtering to the calculation module 202, deletes the one or more selected words of the multiple words. Thus, the inquiry unit 401, when performing a subsequent inquiry on the word vectors of words, will not consider the words that are filtered out (e.g., deleted) by the filtering module 207, thereby reducing calculation volume.

In various embodiments, the apparatus may be located at a single computer, and/or the modules of the apparatus may be located at different computers. In some embodiments, the functions of the apparatus are implemented by a collaboration of multiple computers. The modules or units of the apparatus can be implemented in software, hardware, or a combination of software and hardware.

Figure 5:
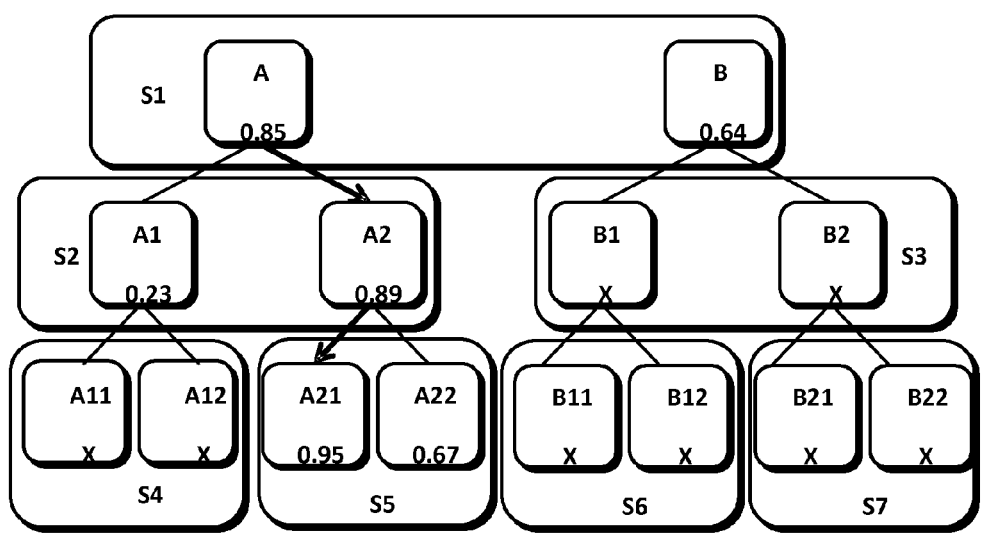
FIG. 5 illustrates exemplary vector spaces in accordance with various embodiments.

FIG. 5 illustrates exemplary vector spaces in accordance with various embodiments. In the example tree class structure shown in FIG. 5, classes A and B constitute a first level vector space S1. Classes A1 and A2 constitute a second level vector space S2. Classes B1 and B2 constitute a second level vector space S3. Classes A11 and A12 constitute a third level vector space S4. Classes A21 and A22 constitute a third level vector space S5. Classes B11 and B12 constitute a third level vector space S6. Classes B21 and B22 constitute a third level vector space S7.

When receiving the text to be classified, the segmentation module 201 segments the obtained text content of the text into multiple words. The calculation module 202 may determine the sum of the word frequency vectors of the multiple words under classes A and B of the first level vector space S1, which may be 0.85 and 0.64 respectively. As such, the classification module 203 may classify the text into class A, which corresponds to the highest word frequency vectors sum. The classification module 203 further determines that class A corresponds to the second level vector space S2. The calculation module 202 determines that the sum of word frequency vectors of the multiple words under classes A1 and A2 of the second level vector space S2, which may be 0.23 and 0.89 respectively. The classification module 203 then classifies the text into class A2, which corresponds to the highest word frequency vectors sum. The classification module 203 further determines that class A2 corresponds to the third level vector space S5. The calculation module 202 determines that the sum of word frequency vectors of the multiple words under classes A21 and A22 of the third level vector space S5, which may be 0.95 and 0.67 respectively. The classification module 203 then classifies the text into class A21, which corresponds to the highest word frequency vectors sum.

In addition with respect to the tree classification structure shown in FIG. 5, the calculation dimension used by the embodiments described herein is six. However, the calculation dimension under existing techniques is eight, which is obviously higher than the former.

Using the examples in FIG. 1 as a reference, the apparatus of the embodiments described herein classify the text into class A1 while an apparatus implementing existing techniques would classify the text into class B1. As a result, it is apparent that the text classification by the apparatus of the embodiments described herein is more accurate.

The above descriptions describe the internal structures and functions of the text classification apparatus. The following descriptions describe the implementation process of the text classification.

Figure 6:
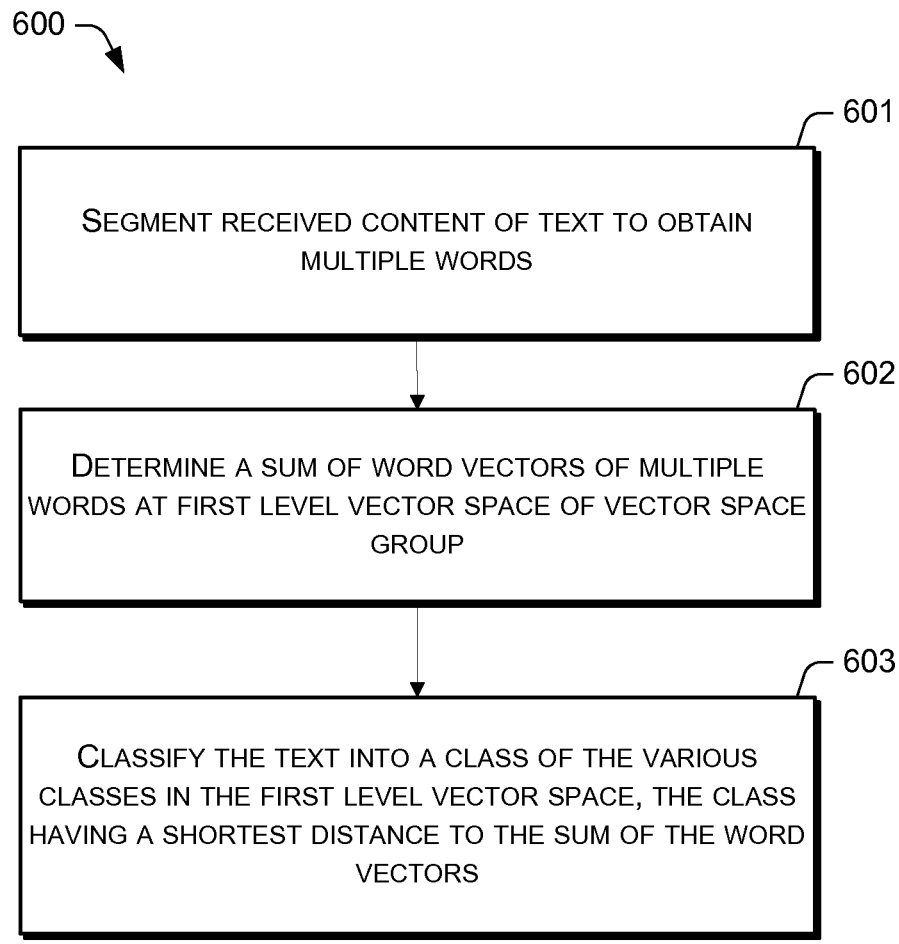
FIG. 6 illustrates a flow chart of an exemplary text classification process in accordance various embodiments.

By reference to FIG. 6, a main flowchart of process 600 for text classification in accordance with various embodiments is as follows:

At step 601, the received content of a text is segmented to obtain multiple words.

At step 602, a sum of word vectors of the multiple words at a first level vector space of a vector space group is determined Each vector space is composed of one or more direct child classes that are non-leaf child classes in a tree class structure. The vector space group is composed of all vector spaces, and the first level vector space is composed of a top-level class of the tree class structure. Each word vector includes the word frequency vectors of the words in a corresponding class of a vector space.

At step 603, the text is classified into a class of the various classes in the first level vector space, the class having a shortest distance to the sum of the word vectors of the text.

In additional embodiments, the text can be stored under a corresponding class in a database.

There are multiple implementation ways in the step 602. The following are three embodiments that detail the implementation process.

Figure 7:
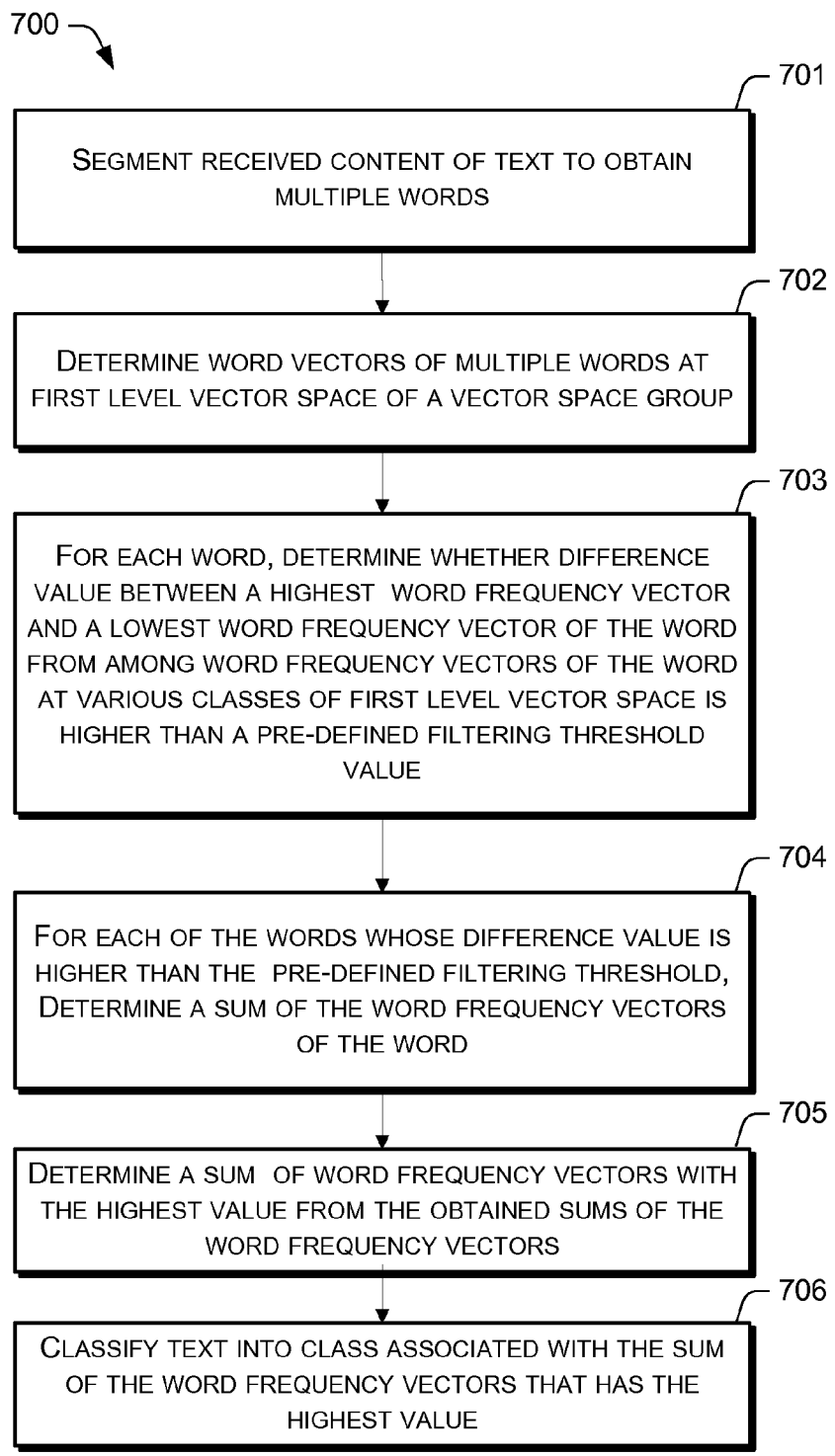
FIG. 7 illustrates a flow chart of an exemplary text filtering process to filter the text according to a first example filtering threshold in accordance with various embodiments.

FIG. 7 illustrates a flowchart of a process 700 for text filtering according to a filtering threshold value. The details of the process are as follows:

At step 701, the received content of the text is segmented to obtain multiple words.

At step 702, the word vectors of the multiple words at the first level vector space of the vector space group are determined.

At step 703, for each word of the multiple words, a determination is made as to whether a difference value between a highest word frequency vector and a lowest word frequency vector of the word from among word frequency vectors of the word at various classes of the first level vector space is higher than a pre-defined filtering threshold value. For example, the pre-defined filtering threshold value may be 1/100,000 of the number of a total word corpus.

At step 704, for each of the words whose difference in value is higher than the filtering threshold value, a sum of the word frequency vectors of the word is obtained.

At step 705, a sum of the word frequency vectors with the highest value is determined from the obtained sums of the word frequency vectors.

At step 706, the text is classified into a class associated with the sum of the word frequency vectors that has the highest value.

Figure 8:
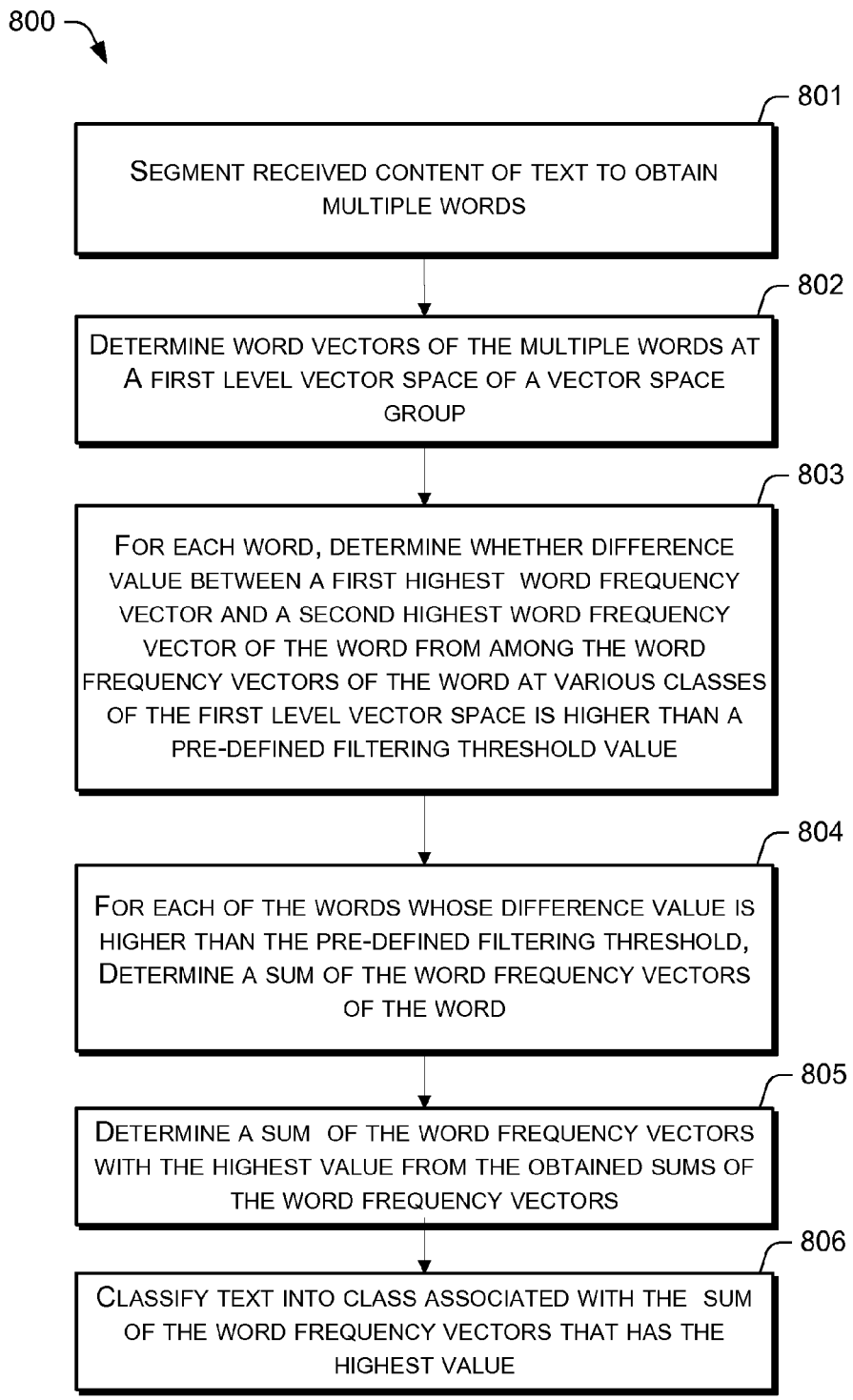
FIG. 8 illustrates a flow chart of an exemplary text filtering process to filter the text according to a second example filtering threshold in accordance with various embodiments.

FIG. 8 illustrates a flowchart of a process 800 for text filtering according to a filtering threshold value. The details of the process are as follows:

A step 801, the received content of the text is segmented to obtain multiple words.

At step 802, the word vectors of the multiple words at the first level vector space of the vector space group are determined.

At step 803, for each word of the multiple words, a determination is made as to whether a difference value between a first highest word frequency vector of the word and a second highest word frequency vector of the word from among word frequency vectors of the word at various classes of the first level vector space is higher than a pre-defined filtering threshold value. For example, the pre-defined filtering threshold value may be 1/100,000 of the number of a total word corpus.

At step 804, for each of the words whose difference value is higher than the filtering threshold value, a sum of the word frequency vectors of the word is obtained.

At step 805, a sum of word frequency vectors with the highest value is determined from the obtained sums of word frequency vectors.

At step 806, the text is classified into a class associated with the sum of word frequency vectors that has the highest value.

Figure 9:
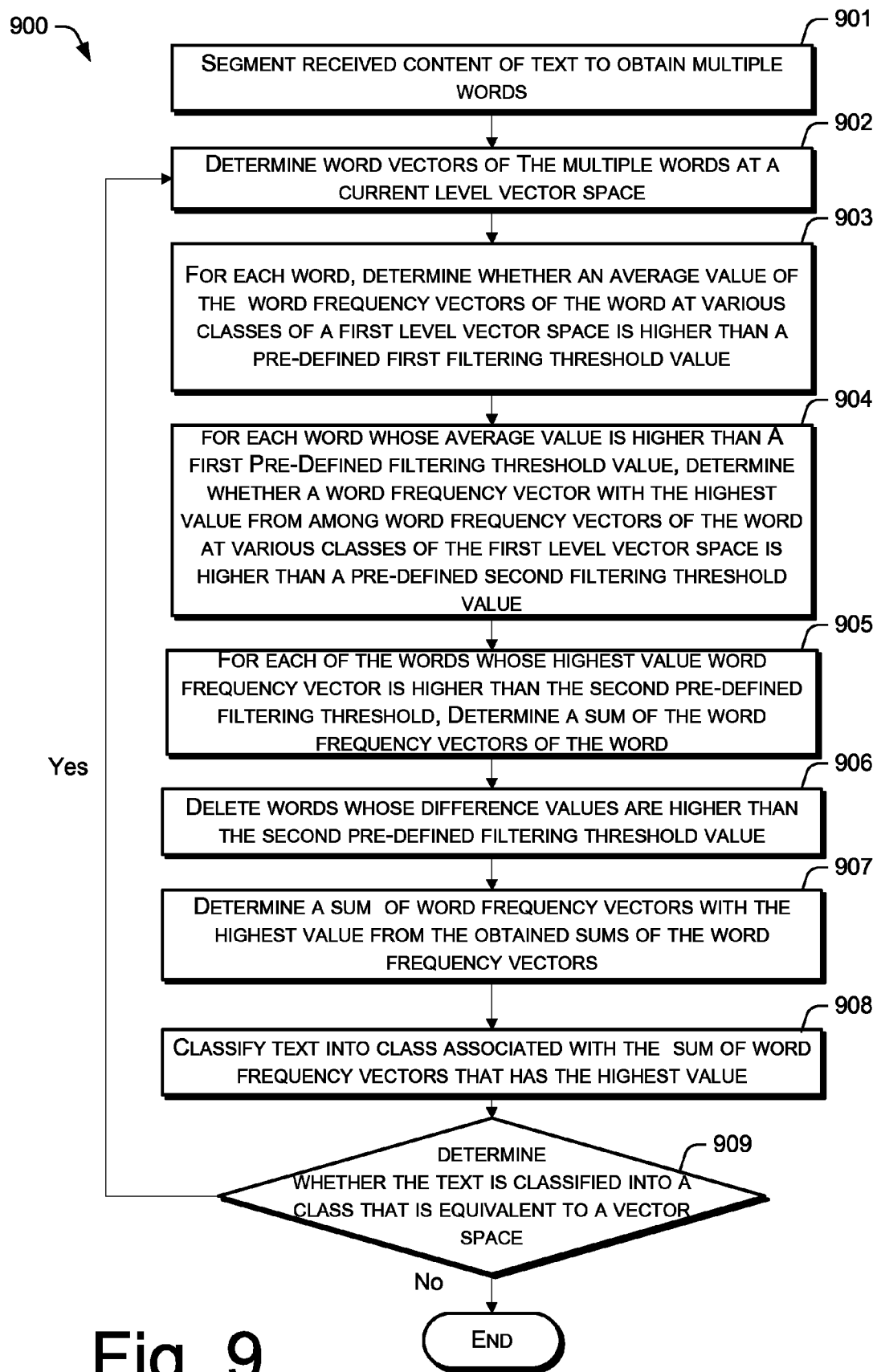
FIG. 9 illustrates a flow chart of an exemplary text filtering process to filter the text according to a first example filtering threshold and a second example filtering threshold in accordance with various embodiments.

FIG. 9 illustrates a flowchart of method for text filtering according to a first filtering threshold value and a second filtering threshold value. The detailed process is described as follows:

At step 901, the received content of the text is segmented to obtain multiple words.

A step 902, the word vectors of the multiple words at a current level vector space are determined When this step is implemented for a first time, the current level vector space is the first level vector space of the space vector group.

At step 903, for each word of the multiple words, a determination is made as to whether an average value of the word frequency vectors of the word at various classes of the first level vector space is higher than a pre-defined first filtering threshold value. For example, the predefined first filtering threshold value may be 1/100,000 of the number of a total word corpus.

At step 904, for each word whose average value of the word frequency vectors is higher than the first filtering threshold value, a determination is made as to whether a word frequency vector with the highest value from among the word frequency vectors of the word at various classes of the first level vector space is higher than a pre-defined second filtering threshold value. For example, the pre-defined second filtering threshold value may be 1/100,000 of the number of a total word corpus.

At step 905, for each of the words whose highest value word frequency vector is higher than the second filtering threshold value, a sum of the word frequency vector of the word is obtained.

At step 906, words whose difference values are higher than the second filtering threshold from the obtained words are deleted. The difference value for each of the words is derived in a manner that is similar to that described in step 703 of the process 700. This step can be concurrently performed with the step 905.

A step 907, a sum of word frequency vectors with the highest value is determined from the obtained sums of word frequency vectors.

At step 908, the text is classified into a class associated with the sum of word frequency vectors that has the highest value.

At step 909, a determination is made as to whether the class that the text is classified into is equivalent to a vector space. If affirmative, a vector space that replaces the current level vector space is determined, and the process loops back to the step 902; otherwise the process is terminated.

The embodiments of the present disclosure can be implemented by software and/or hardware. The software to implement the embodiments of the present disclosure can be stored at a storage medium such as a floppy disk, hard disk, disc, and flash memory.

With respect to the problem of low effects at high dimensional calculation, the embodiments of the present disclosure can maintain characters of the data statistics. With respect to the requirement of uniformity of word corpus required by existing text classification techniques, the embodiments of described herein permit non-uniformity of some classes of the word corpus, which would not affect the whole word corpus. With respect to ambiguous classifications, i.e., the word frequency calculation values do not have much difference between multiple classes, the embodiments described herein largely reduces rate of such occurrence by words filtering. With respect to the problem that there may be serious recognition errors for non-leaf child classes, the embodiments described herein provide a top to bottom classification method, thereby largely reducing the recognition errors. With respect to the impact of high dimensions to recognition accuracy, the embodiments described herein classifies the classes into multiple vector spaces, and maintain the accuracy of vector space model (VSM) at low dimensions, thereby largely reducing the problem of declining accuracy with rising dimensions. With respect to optimizing word selections, space dimension is quite high in existing text classification techniques, thereby reducing the probability of word exclusions. The embodiments described herein use multiple low dimensional vector spaces to effectively solve the problem. The embodiments described herein also reduce the actual traversed dimensions for each class classification. Thus, the actually traversed scope for each class classification is lower than the total number of the leaf child classes. Compared with the existing text classification techniques, the embodiments described herein are in a better position to comply with the principles of statistics and can achieve higher recognition accuracy.

As a result, the more accurate text classification provided by the embodiments described herein is beneficial to improving the accuracies of text classification storage and text classification search.

It is appreciated that one of ordinary skill in the art can alter or modify the present disclosure in many different ways without departing from the spirit and the scope of this disclosure. These modifications and variations should therefore be considered to be within the scope of the claims of the present disclosure and their equivalents.

What is claimed is:

1. A computer-implemented method for text classification comprising:
    segmenting content of a text into multiple words;
    determining a sum of a plurality of word vectors of an individual word of the multiple words at a first level vector space of a vector space group that includes a plurality of vector spaces, at least one of the plurality of vector spaces comprising one or more direct child classes that are non-leaf child classes in a tree class structure, the first level vector space having a plurality of classes, an individual word vector of the plurality word vectors including word frequency vectors of a corresponding word of the multiple words at multiple classes of the vector space; and
    classifying the text into a class of the plurality of classes that has a shortest distance to the sum of the plurality of word vectors of the word vectors.

2. The method as recited in claim 1, wherein the first level vector space is in a top level of the tree class structure.

3. The method as recited in claim 1, further comprising:
    prior to determining the sum of the word vectors of the multiple words at the first level vector space of the vector space group, filtering the multiple words to obtain multiple filtered words.

4. The method as recited in claim 1, wherein classifying the text into the class that has the shortest distance to the sum of the word vectors comprises:
    determining a corresponding sum for word frequency vectors in the plurality of classes that are associated with each of the multiple words; and
    classifying the text into a class corresponding to a highest sum.

5. The method as recited in claim 4, further comprising: deleting at least some of the multiple words that are used to determine the sums of the word vectors after classifying the text into the class.

6. The method as recited in claim 1, wherein classifying the text into the class that has the shortest distance to the sum of the word vectors comprises:
    determining a difference value between a highest word frequency vector and a lowest word frequency vector among the word frequency vectors for each of the multiple words at the plurality of classes;
    determining a sum of the corresponding word frequency vectors for each of the multiple words with a corresponding difference value that is higher than a pre-defined filtering threshold; and
    classifying the text into a class of the plurality of classes that is associated with a sum of the corresponding word frequency vectors that has the highest value.

7. The method as recited in claim 1, wherein classifying the text into the class that has the shortest distance to the sum of the word vectors comprises:
    determining a difference value between a first highest word frequency vector and a second highest word frequency vector among the word frequency vectors for each of the multiple words at the plurality of classes;
    determining a sum of the corresponding word frequency vectors for each of the multiple words with a corresponding difference value that is higher than a pre-defined filtering threshold; and classifying the text into a class of the plurality of classes that is associated with a sum of the corresponding word frequency vectors that has the highest value.

8. The method as recited in claim 1, wherein classifying the text into the class that has the shortest distance to the sum of the word vectors comprises:

determining an average value of corresponding word frequency vectors for each of the multiple words at the plurality of classes;

determining whether a highest value word frequency vector is higher than a second pre-defined filtering threshold for each of one or more of the multiple words associated with a corresponding average value that is higher than a first pre-defined filtering threshold;

determining a sum of the corresponding word frequency vectors for each of the one or more words with a highest value word frequency vector that is higher than the second pre-defined filtering threshold; and classifying the text into a class associated with a sum of the corresponding word frequency vectors that has the highest value.

9. The method as recited in claim 1, further comprising:

determining whether the class is equivalent to the first level vector space after classifying the text into the class; and when the class is equivalent to the first level vector space,
determining sums of word vectors of the multiple words at additional classes in the plurality of vector spaces; and
classifying the text into an additional class that is not equivalent to the first level vector space and corresponds to a highest sum of the sums of the word vectors.

10. An apparatus for text classification, comprising:

a segmentation module that segments content of text into multiple words;

a calculation module that determines a sum of word vectors of an individual word of the multiple words at a first level vector space of a vector space group that includes a plurality of vector spaces, at least one of the plurality of vector spaces comprising one or more direct child classes that are non-leaf child classes in a tree class structure, the first level vector space having a plurality of classes, the first level vector space including multiple classes that are in a top level of the tree class structure; and a classification module that classifies the text into a class of the plurality of classes that has a shortest distance to the sum of the word vectors.

11. The apparatus as recited in claim 10, further comprising a filtering module that filters the multiple words to obtain multiple filtered words.

12. The apparatus as recited in claim 10, wherein:

the calculation module further determines a corresponding sum for word frequency vectors in the plurality of classes of the first level vector space that are associated with each of the multiple words; and the classification module further classifies the text into a class corresponding to a highest sum.

13. The apparatus as recited in claim 10, wherein the classification module is further configured to:

determine whether the class is equivalent to the first level vector space following classifying the text into the class; and when the class is equivalent to the first level vector space,
determine sums of word vectors of the multiple words at additional classes in the plurality of vector spaces; and
classify the text into an additional class that is not equivalent to the first level vector space and corresponds to a highest sum of the word vectors.

14. The apparatus as recited in claim 13, wherein the calculation module is further to:

delete at least some of the multiple words that are used to determine the sums of the word vectors following the classifying the text into the class.

15. The apparatus as recited in claim 10, further comprising a first filtering module that determines an average value of corresponding word frequency vectors for each of the multiple words at the plurality of classes; and a second filter module that determines whether a highest value word frequency vector is higher than a second pre-defined filtering threshold for each of one or more of the multiple words associated with a corresponding average value that is higher than a first pre-defined filtering threshold, wherein the calculation module further determines a sum of the corresponding word frequency vectors for each of the one or more words with a highest value word frequency vector that is higher than the second pre-defined filtering threshold, and wherein the classification module further classifies the text into a class of the plurality of classes associated with a sum of the corresponding word frequency vectors that has the highest value.

16. A computer-implemented method for text classification, the method comprising:

receiving a text for classification into a plurality of classes, at least one of the plurality of classes including one or more direct child classes that are non-leaf child classes in a tree class structure;

segmenting content of the received text into multiple words, each of the multiple word having corresponding word frequency vectors;

determining a value for each of the multiple words at individual classes of the plurality of classes using the corresponding word frequency vectors of each of the multiple words;

determining a sum of the corresponding word frequency vectors for each of the multiple words that has the value higher than a pre-defined filtering threshold; and classifying the text into a class of the plurality of classes that is associated with a sum of the corresponding word frequency vectors that has a highest value.

17. The method as recited in claim 16, wherein determining the value for each of the multiple words includes determining a difference value between a highest word frequency vector and a lowest word frequency vector among the corresponding word frequency vectors for each of the multiple words at the plurality of classes.

18. The method as recited in claim 16, wherein determining the value for each of the multiple words includes determining a difference value between a first highest word frequency vector and a second highest word frequency vector among the word frequency vectors for each of the multiple words at the plurality of classes.

* * * * *